July 22, 1958 K. WERNICK 2,844,658

ARRANGEMENT FOR TELEPHONES WITH AN AMPLIFYING DEVICE CONNECTED IN SERIES WITH THE RECEIVER CAPSULE

Filed Nov. 23, 1955

INVENTOR
K. WERNICK

BY Robert Harding Jr.

ATTORNEY

United States Patent Office 2,844,658

Patented July 22, 1958

2,844,658

ARRANGEMENT FOR TELEPHONES WITH AN AMPLIFYING DEVICE CONNECTED IN SERIES WITH THE RECEIVER CAPSULE

Klaus Wernick, Ludwigsburg, Wurttemberg, Germany, assignor to International Standard Electric Corporation, New York, N. Y., a corporation of Delaware Application November 23, 1955, Serial No. 548,685

4 Claims. (Cl. 179—81)

Figure 1:
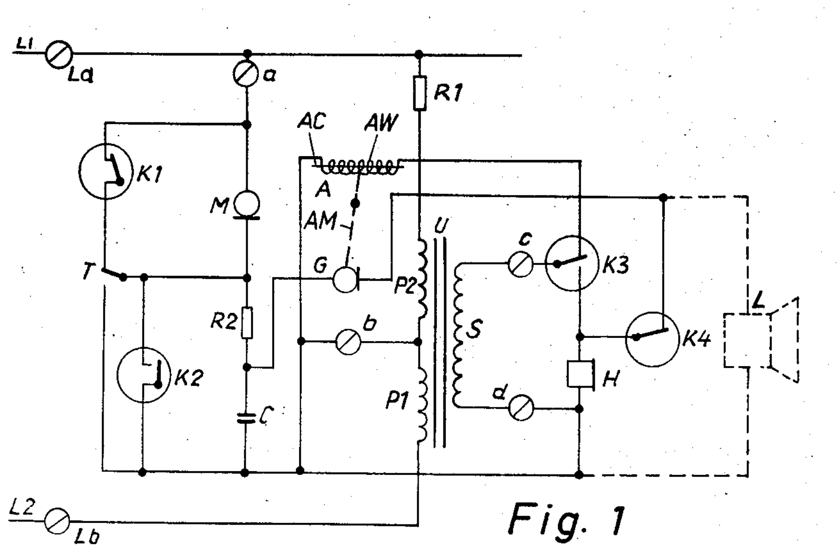

The present invention relates to telephone circuits in general and more particularly to improved substation telephone circuits of the variable type employing received signal strength changing means under the control of the subscriber to change the level of received signals.

An object of the invention is an arrangement for telephones with an amplifying device connected in series with the receiver capsule for selectively affecting the received signal strength. The increase of the reproduction sound volume is supposed to effect a compensation of the various attenuations of connections, and to enable reception when the receiver is placed on the table, viz. to enable the so-called free or "no-hands" talking. This free talking is of particular advantage when receiving messages which have to be taken down in writing, because it renders the writing more easy.

It is known to compensate for the various degrees of attenuation of connections to compensate for the sound volume in special types of telephones, by providing special manual switches for connecting attenuators in series or shunt connection of particularly high-efficiency receiver capsules. It is further known, by arranging and attaching additional devices comprising amplifiers, to increase the audio level at the sub-station to such extent that, loudspeaker-like reception may be had and, thus telephoning at a distance may be realized when the receiver is placed on the table. One conventional arrangement of the latter type operates with a continuous or permanent amplification of signals with no selective switching on or off.

The invention provides an arrangement for selectively amplifying the level of the sound and aims to avoid the employment of any special additional amplifier devices or any special equipment at the substation for the purpose of enabling the incorporation therein of an amplifying device. This is accomplished by utilizing a switch arranged in the handset which is adapted to selectively switch the amplifying device on or off. When the said amplifying device is switched on, the microphone is shunted, and that this shunt will be eliminated only upon switching the amplifier off by actuating and depressing a manual key or a position-dependent switch when correspondingly changing the position of the handset.

The advantage of the invention may be seen in the fact that every normal type telephone subset, can be utilized for an operation employing an amplification of the sound volume by merely providing a modified handset which will includes the switch and the amplifier. The switching on of the amplifier, during normal telephoning practice, can be easily effected by hand, i. e. by that hand holding the handset. If the amplifier were not housed in the handset, additional conductors leading from the switch to the amplifier would be required, rendering it impossible to use a normal type subset having the usual number of conductors leading from the handset to the stationary portion of the substation.

Appropriately the amplifier device consists of carbon granules which are mechanically stressed and which give amplification.

The above-mentioned and other features and objects of this invention and the manner of attaining them will become more apparent and the invention itself will be best understood, by reference to the following description of an embodiment of the invention taken in conjunction with the accompanying drawings, wherein:

Fig. 1 diagrammatically represents a substation circuit utilizing a single carbon button electromechanical amplifier.

Figure 2:
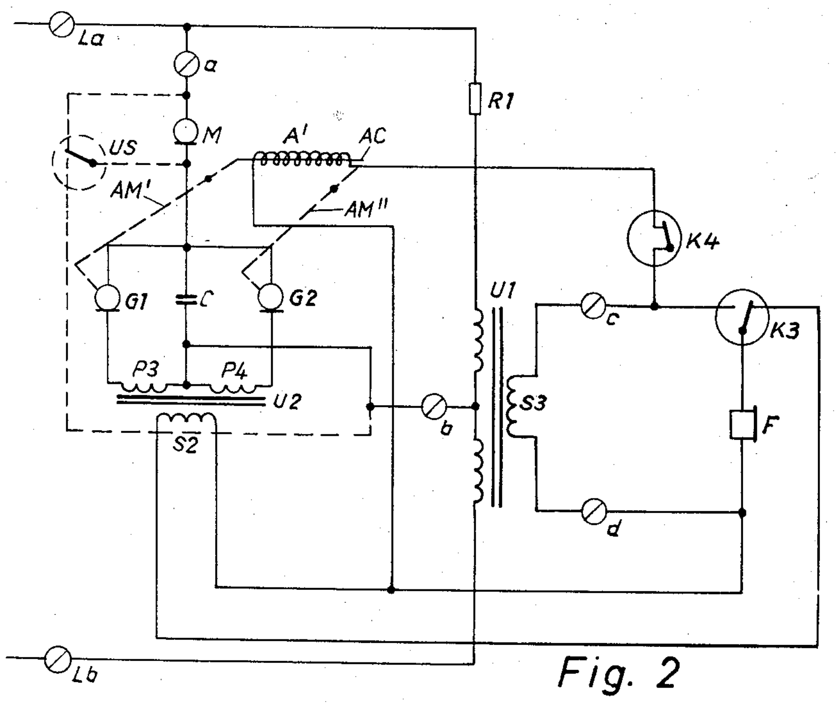

Fig. 2 diagrammatically represents a substation circuit utilizing a pair of carbon button electromechanical amplifiers in a push-pull arrangement.

Referring now to Fig. 1 the letters *a, b, c, d* denote the connecting terminals for the leads leading from the stationary part of the telephone subset to the handset. L*a* and L*b* denote the connecting line terminals for connecting the substation to the central exchange (not shown). R1 is the balance resistance and U the telephone transformer each housed in the stationary portion of the subset. M denotes the normal type microphone and H the normal type receiver capsule. The amplifier device according to the invention, is arranged within the handset and consists of an electromagnetic driving device A operatively coupled with carbon granule button G. The driving device A includes an armature AM which is attracted to the core AC and about which core a winding AW is placed. The armature AM is pivoted at point AP to gain a mechanical advantage, so that the button G is vibrated heavily in proportion to the attraction of armature AM to core AC, causing heavy fluctuations in the value of the direct current maintained in the circuit over the line L1, L2.

The switch K which is within the telephone handset may be of any known type, the only requirements being that it have multiple contact pairs and that it operate only when the handset is in a predetermined position; e. g., when it is lying on a surface, such as a table. Known types of mercury switches could be used in lieu of contact pairs, each mercury switch corresponding to the contacts K1 . . . K4, shown in Fig. 1, in their operated position. A manual key may be provided in the handset which may be position-dependent as the mercury switches, or which may be actuated by the user of the handset.

Contact K1 is adapted to shunt the microphone M to prevent acoustic feedback. Contact K2 is adapted to shunt the button G when microphone M is to be used in the normal manner. When open, as shown, contact K2 enables a current path from L*a* through closed contact K1 through resistance R2, button G, closed contact K4, receiver H, terminal *b*, primary winding P1 of transformer U to terminal L*b*. Contact K3 is of the double-throw type and selectively applies the output alternating voltages from secondary S of transformer U to either the electromagnetic driving device A (as shown in the drawing) or to the receiver H in the unoperated position of switch K. Contact K4 is included in the series circuit of button G and, when open, disconnects the button G from the series connection with receiver H enabling receiver H to be in series with the secondary S when switch K is unoperated. A loudspeaker L may be utilized in lieu of receiver H or it may be placed in parallel therewith as shown in dotted lines.

The carbon button G is fed by the microphone current via the resistance R2 which serves to maintain normal resistance values when the microphone is short-circuited. Button G delivers an amplified alternating current for the receiver capsule upon actuation of electromagnetic device A. The condenser C serves to complete the A. C. circuit.

The further shown key T, which may also be omitted, serves as a press-to-talk button when the handset is placed on a horizontal support. When being actuated, this key T serves to eliminate the short circuit of the microphone and, by short-circuiting the afore-mentioned series-connection R2, G, K4, H, causes the amplification to become ineffective.

For achieving an independence of the position by simultaneously providing the possibility of a manual operation, the contacts K1–K4 are designed as a set of contact springs, which may be actuated by means of a contactor projecting out of the handset, when placing the handset on a horizontal support, by means of the natural weight of the handset. For enabling transmission from the substation when the handset is placed on the table it is necessary to lift the handset a predetermined distance at that particular point where the contactor projects out of the handset, so that the contactor will be set free. This can be accomplished by providing the handset with knife-edge-like structure which serves as a stiffener and which permits the rocking of the placed-down handset with a small stroke around a center of rotation by means of applying and removing the hand.

Fig. 2 shows an advantageous modification of the circuit arrangement according to Fig. 1. The electro-magnetic driving system A, in this case acts upon two carbon granule chambers G1′ and G2 arranged in a push-pull circuit. The electromagnetic driving device A′ is provided with a pair of pivoted armatures AM′ and AM″, which are adapted to apply push-pull pressure to buttons G1′ and G2. The buttons G1′ and G2 are connected to primary windings P3 and P4 respectively of push-pull transformer U2 whose secondary S2 is serially connected to receiver F through front contacts K3, electromagnet A′ closed contact K4, and secondary winding S3 of transformer U1. Since the connecting point of the two carbon paths and the mean tapping of the push-pull transformers are points of same potential, a reaction of the speaking A.-C., which is received in an amplified manner, upon the transmitting station at the intended feeding of the carbon paths in series with the microphone is substantially reduced also at an unavoidable small asymmetry. The condenser C serves to further reduce the reaction voltage. In the case a very large amplification, as indicated by the dash-lines, a double-throw contact US may serve to short-circuit the microphone M, as shown in Fig. 2 in the case of reception and to short circuit the button G1 and G2 during transmission from the substation.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. An amplifying arrangement for a telephone substation comprising a pair of line conductors, coupling means for coupling said substation to said line conductors, a handset comprising a microphone, a receiver, amplifying means having an input and an output, and switch means adapted in a first position to shunt said microphone, connect said input to said coupling means and said output in series with said receiver and in a second position to couple said microphone to said conductors and said receiver to said coupling means, thereby to selectively increase the output level of said receiver.

2. An amplifying arrangement as claimed in claim 1, wherein said amplifying means comprises a core, a winding about said core, a pivoted armature cooperating with said core, and a carbon button coupled to said armature, said armature adapted to apply pressure to said button, said button adapted to cause fluctuations in the value of direct current which passes through said line conductors.

3. An amplifying arrangement as claimed in claim 1, wherein said switch means comprises a position-dependent switch adapted to operate when said handset is placed in a first position, and to release when said handset is placed in a second position.

4. An amplifying arrangement as claimed in claim 1, wherein said amplifying means comprises a pair of carbon buttons, a single core, a winding around said core and a pair of cooperating armatures respective of said armatures operatively associated with said core and a different one of said buttons, a push-pull transformer for coupling said buttons to said receiver.

References Cited in the file of this patent

UNITED STATES PATENTS

| | | |
|---|---|---|
| 2,298,207 | Gent | Oct. 6, 1942 |
| 2,385,265 | Foley | Sept. 18, 1945 |